United States Patent [19]

Morris et al.

[11] Patent Number: 5,442,952
[45] Date of Patent: Aug. 22, 1995

[54] TESTING OF HOSES

[75] Inventors: Fredric J. Morris; Edward F. McKiernan, both of Wooster, Ohio

[73] Assignee: Sealand Technology, Inc., Big Prairie, Ohio

[21] Appl. No.: 288,909

[22] Filed: Aug. 11, 1994

[51] Int. Cl.[6] .......................... G01M 3/20; C10L 5/00
[52] U.S. Cl. .................................................. 73/40.7
[58] Field of Search ................... 73/40.7, 64.47, 64.55

[56] References Cited

U.S. PATENT DOCUMENTS

| | | | |
|---|---|---|---|
| 3,555,884 | 1/1971 | Yamamoto et al. | 73/40.7 |
| 3,798,536 | 3/1974 | Maillard et al. | 324/33 |
| 4,429,566 | 2/1984 | Armell et al. | 73/40.7 |
| 4,507,954 | 4/1985 | Boutwell | 73/40.7 |
| 4,515,751 | 5/1985 | Krieg, Jr. | 422/86 |
| 4,557,139 | 12/1985 | Cantwell et al. | 73/40.7 |
| 4,584,877 | 4/1986 | Brayman | 73/40.7 |
| 4,690,689 | 9/1987 | Malcosky et al. | 48/174 |
| 5,167,867 | 12/1992 | Quaife et al. | 252/408.1 |

FOREIGN PATENT DOCUMENTS 0542042  5/1993  European Pat. Off. ............ 73/40.7

*Primary Examiner*—Hezron E. Williams
*Assistant Examiner*—J. David Wiggins
*Attorney, Agent, or Firm*—Nixon & Vanderhye

[57] ABSTRACT

Hose samples are tested to determine their permeability to noxious odors when used to conduct sewage. A hose sample is preferably pre-treated with methyl alcohol for several days to accelerate the rate of failure. Then the open ends of the hose sample tubular body are sealed and the tubular body is covered with a flexible generally (although not necessarily completely) sulfur-containing gas-impervious material (such as nylon film) to define a gas volume between the exterior surface of the hose and the film. Carbon disulfide, dimethyl sulfide, and/or dimethyl disulfide are introduced into the interior of the hose and allowed to stand for at least a day, and then the content of any gas in the gas volume between the exterior surface and the hose is evaluated to see if it is gas from carbon disulfide or like fluids introduced into the hose. Typically evaluation is done by making a slit in the gas impervious material just large enough for an end of a detector tube, hooking the detector tube to an evacuating pump, operating the evacuating pump to draw gas from the gas volume into the detector tube, and analyzing the withdrawn gas for carbon disulfide, etc. The slit may be resealed with the self-adhesive tape.

20 Claims, 2 Drawing Sheets

TESTING OF HOSES

BACKGROUND AND SUMMARY OF THE INVENTION

Hoses, particularly flexible hoses, that are used to transmit sewage, such as on boats, recreational vehicles, or the like, often have the problem of transmitting noxious odors from the sewage to the surrounding environment. This has been a major problem in the industry, and much research is done to attempt to find materials which will not transmit noxious odors. However in order to properly test such hoses it is necessary to develop a testing procedure that is cost-effective and accurate.

According to the present invention the fluids which cause the noxious odors which permeate conventional hoses have been identified as sulfur-containing gases, such as carbon disulfide, dimethyl sulfide, and/or dimethyl disulfide (typically all existing at once with carbon disulfide predominating). Using this information, as well as commercially available materials, a procedure has been developed which allows efficient yet effective testing of hose samples. The testing procedure according to the present invention is not only relatively simple, accurate, and cost-effective, it also allows testing to be performed in an accelerated manner. This reduces the time for testing without sacrificing accuracy. Testing can be conducted as long as necessary, and the invention makes it easy to compare the noxious gas permeability of different types of hoses to ensure the best ones are selected (even if none of the hoses are completely resistant to transmission of noxious odors).

According to one aspect of the present invention it has been recognized that methyl alcohol is effective to accelerate the rate of failure of hoses, such as flexible hoses made of PVC (rigid PVC is not permeable). If a hose is conditioned with methyl alcohol the conditioning will not cause the hose to fail if it would otherwise not fail, it merely accelerates the rate of failure. For example without conditioning it may take two weeks for a hose to transmit enough noxious gas that 10 ppm of carbon disulfide is detected. With conditioning the same hose could fail in three days with 40 ppm detected. If the test hose does not fail with conditioning, it most likely will not fail at all.

According to one aspect of the present invention a method of testing hose samples to determine the permeability thereof when used to conduct sewage, each hose sample including a tubular body with open ends, an interior volume, and an exterior surface, is provided. The method comprises the steps of: (a) Sealing the open ends of the hose sample. (b) Introducing methyl alcohol into the hose sample interior volume and allowing it to stand in the hose sample for at least about twenty four hours, and then emptying the alcohol from the hose sample. (c) Introducing fluid which comprises or produces sulfur-containing noxious gases into the hose sample interior volume and allowing the fluid containing hose sample to stand for at least about twenty four hours; and then (d) after about twenty four hours or more, determining whether or not any sulfur-containing gas from the fluid introduced in step (c) has passed through the hose tubular body.

According to the invention a particularly advantageous and effective manner of determining whether there has been permeation of the hose sample with noxious odor gases is provided. According to this aspect of the invention a method of testing the hose samples, as generally called for above, to determine the permeability thereof to noxious odors when used to conduct sewage, is provided. This method comprises the steps of: (a) Sealing the open ends of the hose sample tubular body. (b) Covering the tubular body with a flexible generally (although not necessarily completely) sulfur-containing gas-impervious material, to define a gas volume between the exterior surface of the tubular body and the gas-impervious material. (c) Introducing fluid carbon disulfide, dimethyl sulfide, dimethyl disulfide, or combinations thereof, into the interior volume of the tubular body, and allowing the sealed tubular body to stand for at least about twenty four hours. And then (d) after about twenty four hours or more, evaluating the content of any gas in the gas volume between the exterior surface of the tubular body and the gas impervious material to see if any of the gas in the gas volume is from fluid introduced in step (c) [and typically rejecting the hose sample if it is, or is more than a certain amount].

Step (d) may be repeated several times until fluid introduced into step (c) is detected in the gas volume, or the hose sample is considered to be substantially impermeable (for the use intended) to the fluid introduced in step (c) and therefore has passed the test.

Each time step (d) is practiced it may be practiced utilizing a detector tube and evacuating pump. A slit is made in the gas impervious material (such as nylon film) just large enough for an end of the detector tube to be inserted into the gas volume, the detector tube is hooked up to the evacuating pump, and the pump is operated to draw gas from the gas volume into the detector tube. After completion of step (d) the tube is withdrawn from the slit and the slit is sealed as by covering it with a gas impervious self-adhesive tape. Normally the fluid introduced in step (c) includes a significant quantity of carbon disulfide and a detector tube detects carbon disulfide, so that step (d) is practiced to detect carbon disulfide in the gas volume. A Drager tester is typically employed.

Step (c) may be practiced by introducing into the hose sample interior volume either gas or liquid having a ratio-by-volume of about two parts carbon disulfide and about one part each dimethyl sulfide and dimethyl disulfide. When the reagents are introduced as liquid, typically only about 1.0 ml liquid is necessary.

Typically stop (d) is practiced by allowing the sealed hose sample to stand for about three–six days at ambient conditions (and the same amount of time between each subsequent test), which is sufficient time if the hose is conditioned with methyl alcohol as described earlier. Normally a hose sample is about twelve inches in length, and about one pint of methyl alcohol is introduced into and then removed from the hose sample to condition it, the methyl alcohol normally remains in the hose about three–six days.

It is the primary object of the present invention to effectively test hose samples to determine the permeability thereof to noxious odors when used to conduct sewage. This and other objects of the invention will become clear from an inspection of the detailed description of the invention and from the appended claims.

DETAILED DESCRIPTION OF THE DRAWINGS

Figure 1:
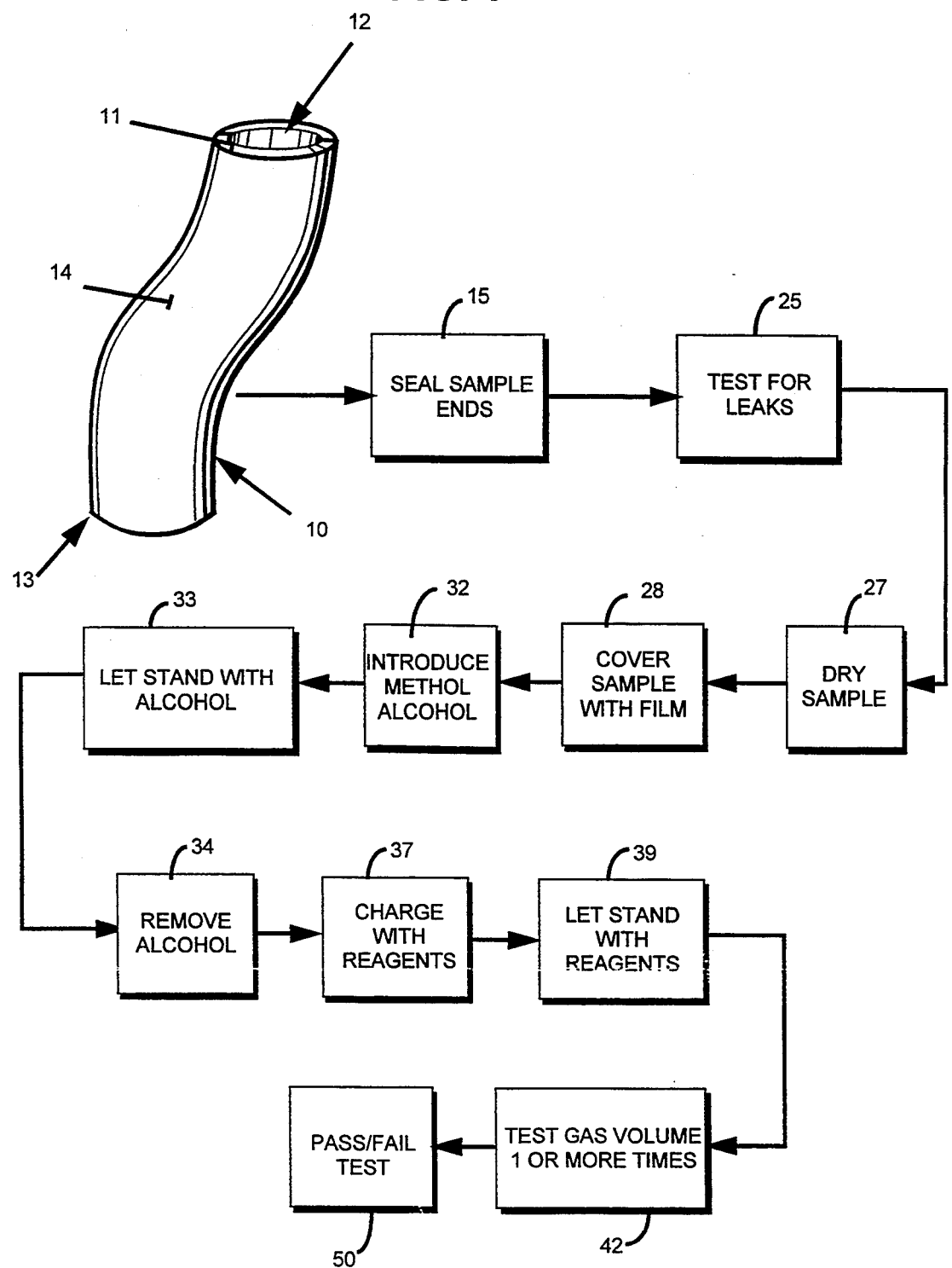
FIG. 1 is a box diagram schematically illustrating exemplary method steps in the practice of the invention.

FIG. 1 schematically illustrates the method steps that may be utilized according to the present invention. A hose sample, such as a flexible plastic or rubber-like or fabric hose sample 10 is typically cut into a length of about twelve inches, and is used for the testing procedure. Normally duplicate specimens will be cut and one will be used as a control (that is it will not have pretreatment chemical put in it). Each sample includes a tubular body 11 with open ends 12, 13 and an exterior surface 14.

Figure 2:
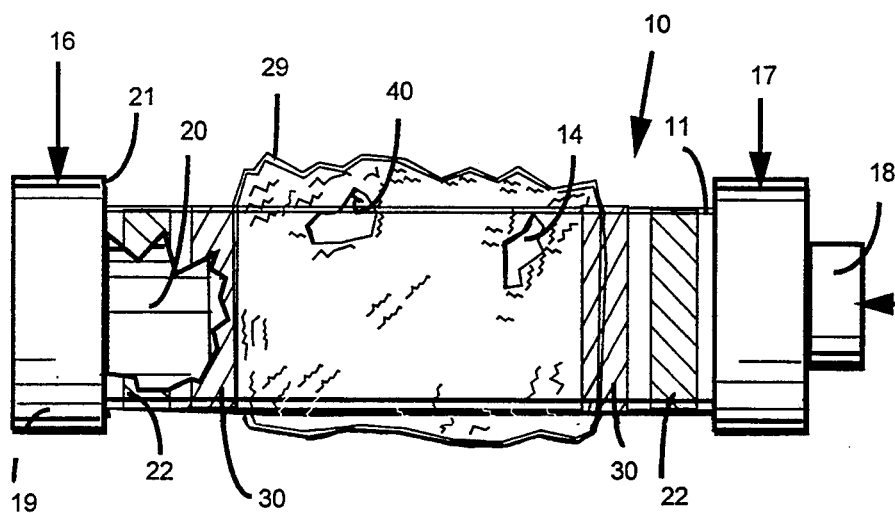
FIG. 2 is a side schematic view of exemplary test apparatus, with test specimen, according to the present invention.

The samples 10 first are acted upon to seal the open ends 12, 13 of the tubular body 11. This step is illustrated schematically at 15 in FIG. 1. One way that this can be accomplished, as illustrated in FIG. 2, is to use a first permanently closed fixture 16 at one end, and a second fixture 17 with a removable (e.g. threaded) plug 18 at the other end of the sample 11. The solid end fixtures 16, 17 are constructed from a material that will not allow passage of gas therethrough, such as rigid PVC. Each fixture 16, 17 (shown only for the fixture 16 in FIG. 2) has a first large diameter portion 19 which is larger than the outside diameter of the tubular body 11, integral with a smaller diameter portion 20 which has an external diameter approximately the same as the internal diameter of the tubular body 11 (e.g. about one and one-half inches). A step 21 is provided between the portions 19, 20. An open end 12, 13 of the body 11 abuts the step 21, and a clamp, such as a typical screw tightenable band clamp 22, is used in association with each of the end fixtures 16, 17 to clamp the specimen body 11 over the small diameter portion 20.

After the open ends 12, 13 of the specimen 10 are sealed, the specimen is tested for leaks, as indicated schematically at 25 in FIG. 1. This may be done, for example, by static testing. The plug 18 is replaced with a barbed hose fitting and connected up to a source of low pressure compressed air (e.g. 0.5 psi or less). Each specimen is then submerged in water to detect leaks which would be indicated by air bubbles. A clamp should not be used to attach the air supply hose to the test specimen. If leaks are detected, the clamps 22 are tightened and the test is repeated.

After testing the samples are dried, as indicated schematically by reference numeral 27 in FIG. 1.

After drying the samples the tubular body 11 of each is covered with a flexible material that is impervious generally (although not necessarily completely) to sulfur-containing gases. Typically a transparent nylon film in a tubular configuration having an interior diameter about 1.5–2 times that of the exterior diameter of the tubular body 11 is utilized. This step is illustrated schematically at 28 in FIG. 1, and the film is shown at 29 in FIGS. 2 and 3. In the embodiment illustrated the tubular film 29 is cut so that a piece about eight inches long is utilized, and it is sealed in gas tight relationship to the exterior surface 14 by using pressure sensitive adhesive, self-adhesive tape strips, such as the strips 30 illustrated in FIG. 2.

One of the samples (not the control) is conditioned so as to accelerate failure. This is illustrated schematically by step 32 in FIG. 1. This is accomplished by substantially filling the sample 10 with methyl alcohol (e.g. introducing it through the threaded cap 18), typically about one pint. The methyl alcohol is allowed to stand inside the tubular body—as indicated at 33 in FIG. 1—at least about twenty four hours, e.g. for about three–six days (typically for five days) at ambient conditions. If a control specimen is used, it is merely filled with water rather than methyl alcohol.

At the end of the conditioning period, the alcohol is removed from the tubular body 11, as indicated schematically by box 34 in FIG. 1. If a control specimen is used, the water is removed therefrom. Then the specimens 10 are ready to be charged with reagents.

According to the present invention, the reagents are introduced through the threaded cap 18, from source 36 illustrated in FIG. 2. The step of charging the specimens with reagents is illustrated schematically at 37 in FIG. 1. It has been found according to the present invention that reagents that achieve the best results include carbon disulfide, dimethyl sulfide, dimethyl disulfide, or combinations thereof. The reagents may be introduced into the interior of the tubular body 11 from source 36 in gaseous form, although preferably they are introduced in liquid form. Since these reagents are volatile, gases will quickly and continuously emanate from the liquid. The total amount of liquid necessary to charge the specimen 10 for a test is typically 1.0 ml or less. While a wide variety of reagent combinations are practical, a preferred reagent is a mixture comprising a volume ratio of two parts carbon disulfide, and one part each dimethyl sulfide and dimethyl disulfide.

Figure 3:
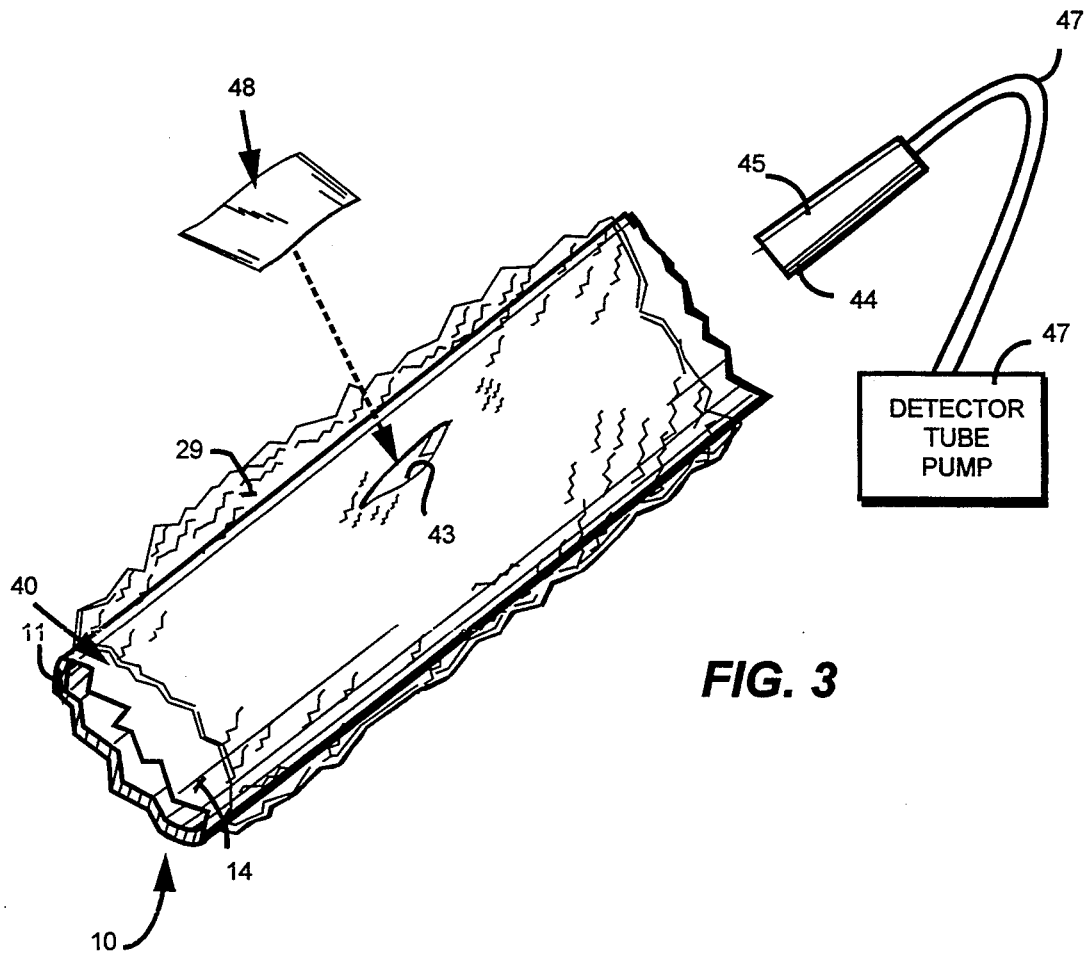
FIG. 3 is a schematic perspective detail view showing the use of a detector tube to detect sulfur-containing gas in the gas volume of the apparatus of FIG. 2.

After the reagents are introduced into the interior of the tubular body 11 through the threaded cap 18, the specimen stands for at least twenty four hours, and preferably three to six days (e.g. about five days), as illustrated schematically at 39 in FIG. 1. After the passage of the predetermined period of time, the content of any gas in the gas volume 40 (see FIG. 2) between the exterior surface 14 of the hose sample 10 and the gas impervious material 29 is evaluated to see if any of the gas in the gas volume is from the reagent fluid introduced into the hollow interior of the body 11 (e.g. carbon disulfide). This evaluation—which is indicated schematically at 42 in FIG. 1—is preferably practiced as schematically illustrated in FIG. 3. A slit 43 is cut in the film 29 with a knife or scalpel, and typically the slit 43 is just large enough to allow the end 44 of a conventional detector tube 45 (see FIG. 3) to be inserted into the gas volume 40. The detector tube 45 may be of any suitable type, preferably one that is capable of detecting carbon disulfide in the 3–95 ppm range. One example of the detector tube 45 that can be utilized according to the invention is a Drager toxic gas detector tube available from Dragerwerk Aktiengesellschaft of Lubec, Germany.

The detector tube 45 is connected up, e.g. via conduit 46, to a vacuum pump which draws gas in the volume 40 through the detector tube 45, a typical pump being illustrated schematically at 47 in FIG. 3. For example a model 31 Drager Multi-Gas Detector may be utilized for the testing equipment, a different tube 45 being utilized each time one tests the gas volume 40.

After a test is done the parts per million of carbon disulfide, or whatever other gas is being tested, is recorded (e.g. 40 ppm would indicate a clear failure).

After testing the slit 43 is sealed, e.g. such as by using a piece of self-adhesive pressure sensitive tape, shown schematically at 48 in FIG. 3, which is placed over the slit 43 and is impervious to the gas. If the sample 10 did not fail in the first test of volume 40, evaluation of the gas volume 40 may be practiced as many times as desired in order to have full confidence that the sample 10 will pass, between each test the sample 10 preferably remaining substantially static, with the reagents therein, about three–six (e.g. five) days. Ultimately a determination is made—as indicated by box 50 in FIG. 1—that the sample 10 has either passed or failed.

The results of the testing on the sample 10 may be compared to the results of testing of the control (which was not treated with methyl alcohol), when a control is used, in order to increase confidence that the test results are valid.

The method as described above can be used not only in a laboratory during research, but also as a quality control test for hoses shipped. Since the method according to the present invention may easily be practiced in about six–twenty five days, total time, after manufacture hose can be warehoused until the representative samples thereof have been tested before shipment.

While FIG. 2 illustrates exemplary apparatus that may be used in the practice of the invention, it should be understood that the apparatus is exemplary, and that the details of the apparatus may depend upon the size and material of the samples to be tested. For example when the samples are a flexible hose having a relatively large (e.g. one and one-half inch) inside diameter, the apparatus as illustrated in FIG. 2 is ideal. However where the diameters are small or the hose is constructed of materials that cannot be glued or clamped, other apparatus must be utilized to effect sealing of the ends of the specimen to allow testing.

It will thus be seen that according to the present invention a simple yet effective method of determining the permeability of hose samples to noxious odors when used to conduct sewage has been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of testing hose samples to determine the permeability thereof to noxious odors when used to conduct sewage, each hose sample including a tubular body with open ends, an interior volume, and an exterior surface, comprising the steps of:
    (a) sealing the open ends of the hose sample tubular body;
    (b) covering the tubular body with a flexible generally sulfur-containing gas-impervious material, to define a gas volume between the exterior surface of the tubular body and the gas-impervious material;
    (c) introducing fluid carbon disulfide, dimethyl sulfide, dimethyl disulfide, or combinations thereof, into the interior volume of the tubular body, and allowing the sealed tubular body to stand for at least about twenty four hours; and then
    (d) after about twenty four hours or more, evaluating the content of gas in the gas volume between the exterior surface of the tubular body and the gas impervious material to see if any of the gas in the gas volume is from fluid introduced in step (c); and
comprising the further steps, prior to step (c), of (e) introducing methyl alcohol into the hose sample interior volume, (f) allowing the alcohol to stand in the hose sample for at least about twenty four hours, and then (g) emptying the alcohol from the hose sample.

2. A method as recited in claim 1 wherein step (d) is repeated several times until fluid introduced in step (c) is detected in the gas volume, or the hose sample is considered to be substantially impermeable to the fluid introduced in step (c) and therefore has passed the test.

3. A method as recited in claim 2 wherein each time step (d) is practiced using a detector tube and evacuating pump and by making a slit in the gas-impervious material just large enough for an end of a detector tube to be inserted into the gas volume, hooking up the detector tube to the evacuating pump, and operating the pump to draw gas from the gas volume into the detector tube.

4. A method as recited in claim 3 wherein each time step (d) is completed there are the further steps of withdrawing the detector tube from the slit, and sealing the slit.

5. A method as recited in claim 4 wherein step (c) is practiced to introduce at least a significant quantity of carbon disulfide, and the detector tube detects carbon disulfide; and wherein step (d) is practiced to detect carbon disulfide in the gas volume, and wherein the step of sealing the slit is practiced by covering it with gas-impervious self-adhesive tape.

6. A method as recited in claim 1 wherein step (d) is practiced by allowing the sealed hose sample to stand for about three–six days at ambient conditions.

7. A method as recited in claim 2 wherein each time step (d) is practiced by allowing the sealed hose sample to stand for about three–six days at ambient conditions.

8. A method as recited in claim 1 wherein the hose sample is about twelve inches in length, and wherein about one pint of methyl alcohol is introduced into and then removed from the hose sample interior volume prior to step (c).

9. A method as recited in claim 1 wherein step (d) is repeated several times until fluid introduced in step (c) is detected in the gas volume, or the hose sample is considered to be substantially impervious to the fluid introduced in step (c) and therefore has passed the test.

10. A method as recited in claim 9 wherein each time step (d) is practiced using a detector tube and evacuating pump and by making a slit in the gas-impervious material just large enough for an end of a detector tube to be inserted into the gas volume, hooking up the detector tube to the evacuating pump, and operating the pump to draw gas from the gas volume into the detector tube.

11. A method as recited in claim 10 wherein each time step (d) is completed there are the further steps of withdrawing the detector tube from the slit, and sealing the slit.

12. A method as recited in claim 11 wherein step (c) is practiced to introduce at least a significant quantity of carbon disulfide, and the detector tube detects carbon disulfide; and wherein step (d) is practiced to detect carbon disulfide in the gas volume.

13. A method as recited in claim 12 wherein the step of sealing the slit is practiced by covering it with gas-impervious self-adhesive tape, and wherein step (b) is practiced using nylon film as the generally gas-impervious material.

14. A method as recited in claim 1 wherein step (c) is practiced by introducing into the hose sample interior volume about 1.0 ml or less of a liquid having a ratio-by-volume of about two parts carbon disulfide, and about one part each dimethyl sulfide and dimethyl disulfide.

15. A method of testing hose samples to determine the permeability thereof to noxious odors when used to conduct sewage, each hose sample including a tubular body with open ends, an interior volume, and an exterior surface, comprises the steps of:
  (a) sealing the open ends of the hose sample;
  (b) introducing methyl alcohol into the hose sample interior volume and allowing it to stand in the hose sample for at least about twenty four hours, and then emptying the alcohol from the hose sample;
  (c) introducing fluid which comprises or produces noxious sulfur-containing gases into the hose sample interior volume and allowing the fluid containing hose sample to stand for at least about twenty four hours; and then
  (d) after about twenty four hours or more determining whether or not any sulfur-containing gas from the fluid introduced in step (c) has passed through the hose tubular body.

16. A method as recited in claim 15 wherein step (c) is practiced by introducing into the hose sample interior volume gas or liquid having a ratio-by-volume of about two parts carbon disulfide, and about one part each dimethyl sulfide and dimethyl disulfide.

17. A method of testing hose samples to determine the permeability thereof to noxious odors when used to conduct sewage, each hose sample including a tubular body with open ends, an interior volume, and an exterior surface, comprising the steps of:
  (a) sealing the open ends of the hose sample tubular body;
  (b) covering the tubular body with a flexible generally sulfur-containing gas-impervious material, to define a gas volume between the exterior surface of the tubular body and the gas-impervious material;
  (c) introducing fluid carbon disulfide, dimethyl sulfide, dimethyl disulfide, or combinations thereof, into the interior volume of the tubular body, and allowing the sealed tubular body to stand for at least about twenty four hours by introducing into the hose sample interior volume gas or liquid having a ratio-by-volume of about two parts carbon disulfide, and about one part each dimethyl sulfide and dimethyl disulfide; and then
  (d) after about twenty four hours or more, evaluating the content of gas in the gas volume between the exterior surface of the tubular body and the gas impervious material to see if any of the gas in the gas volume is from fluid introduced in step (c).

18. A method as recited in claim 17 comprising the further step (e) of testing the sealed tubular body for leaks between steps (a) and (b).

19. A method as recited in claim 18 comprising the further steps of introducing methyl alcohol into the hose sample interior volume, allowing the alcohol to stand in the hose sample for at least about twenty four hours, and then emptying the alcohol from the hose sample.

20. A method as recited in claim 19 wherein step (d) is practiced by allowing the sealed hose sample to stand for about three–six days at ambient conditions.

* * * * *